US 12,345,685 B2

(12) United States Patent
Lazzari et al.

(10) Patent No.: US 12,345,685 B2
(45) Date of Patent: Jul. 1, 2025

(54) METHOD FOR DYNAMIC TESTING USING ULTRASONIC IMAGING

(71) Applicant: VALLOUREC TUBES FRANCE, Meudon (FR)

(72) Inventors: Olivier Lazzari, Meudon (FR); Bada Ndao, Meudon (FR)

(73) Assignee: VALLOUREC TUBES FRANCE, Meudon (FR)

( * ) Notice: Subject to any disclaimer, the term of this patent is extended or adjusted under 35 U.S.C. 154(b) by 380 days.

(21) Appl. No.: 18/006,918

(22) PCT Filed: Jul. 29, 2021

(86) PCT No.: PCT/FR2021/051424
§ 371 (c)(1),
(2) Date: Jan. 26, 2023

(87) PCT Pub. No.: WO2022/023681
PCT Pub. Date: Feb. 3, 2022

(65) Prior Publication Data
US 2023/0266278 A1 Aug. 24, 2023

(30) Foreign Application Priority Data

Jul. 30, 2020 (FR) ...................................... 2008092

(51) Int. Cl.
*G01N 29/06* (2006.01)
*G01N 29/265* (2006.01)
(Continued)

(52) U.S. Cl.
CPC ....... *G01N 29/4463* (2013.01); *G01N 29/069* (2013.01); *G01N 29/265* (2013.01); *G01N 29/27* (2013.01); *G01N 2291/106* (2013.01)

(58) Field of Classification Search
CPC ............. G01N 29/4463; G01N 29/069; G01N 29/265; G01N 29/27; G01N 2291/106;
(Continued)

(56) References Cited

U.S. PATENT DOCUMENTS

| 5,299,576 A | 4/1994 | Shiba |
| 10,429,444 B2 | 10/2019 | Koba et al. |

(Continued)

FOREIGN PATENT DOCUMENTS

| JP | 6114433 B2 | 4/2017 |
| JP | 7233646 B2 | 3/2023 |
| WO | WO 95/28883 A1 | 11/1995 |

OTHER PUBLICATIONS

International Search Report issued Nov. 24, 2021 in PCT/FR2021/051424, filed on Jul. 29, 2021, 2 pages.

*Primary Examiner* — Robert R Raevis
(74) *Attorney, Agent, or Firm* — Oblon, McClelland, Maier & Neustadt, L.L.P.

(57) ABSTRACT

A method for dynamically acquiring data representing a part to be tested, the method includes a multi-element sensor acquiring data concerning the part to be tested, transmitting an ultrasonic shot, receiving a returned wave returned by the part resulting from the ultrasonic shot, generating data representing the part to be tested, and during the data acquisition step, a relative movement between the sensor and the part to be tested, the method further includes generating corrected data representing the part to be tested by simulating a relative movement between the sensor and the part to be tested up to a reference position.

15 Claims, 6 Drawing Sheets

(51) Int. Cl.
*G01N 29/27* (2006.01)
*G01N 29/44* (2006.01)

(58) Field of Classification Search
CPC ........... G01N 29/0645; G01N 29/0654; G01N 29/32; G01N 2291/2634; G01N 29/043; G01N 29/262
USPC ......... 73/1.82, 598, 602, 620, 622, 625, 626
See application file for complete search history.

(56) References Cited

U.S. PATENT DOCUMENTS

| | | |
|---|---|---|
| 11,054,398 B2 | 7/2021 | Hayashi et al. |
| 2007/0053566 A1 | 3/2007 | Kim et al. |
| 2014/0293736 A1 | 10/2014 | Ho et al. |

| | 11 | 11 | | 11 | 11 |
|---|---|---|---|---|---|
| 10 | $E_1R_1$ | $E_1R_2$ | ... | $E_1R_{n-1}$ | $E_1R_n$ |
| 10 | $E_2R_1$ | $E_2R_2$ | ... | $E_2R_{n-1}$ | $E_2R_n$ |
| | ... | ... | ... | ... | ... |
| 10 | $E_nR_1$ | $E_nR_2$ | ... | $E_nR_{n-1}$ | $E_nR_n$ |

Fig. 10

| | | 17 | | 21 | 22 | 23 |
|---|---|---|---|---|---|---|
| 18 | $E_1R_1$ | $E_1R_1(t0-t1)$ | $E_1R_1(t1-t2)$ | $E_1R_1(t2-t3)$ | $E_1R_1(t3-t4)$ |
| 18 | $E_1R_2$ | $E_1R_2(t0-t1)$ | $E_1R_2(t1-t2)$ | $E_1R_2(t2-t3)$ | $E_1R_2(t3-t4)$ |
| 18 | $E_1R_3$ | $E_1R_3(t0-t1)$ | $E_1R_3(t1-t2)$ | $E_1R_3(t2-t3)$ | $E_1R_3(t3-t4)$ |
| 18 | $E_1R_4$ | $E_1R_4(t0-t1)$ | $E_1R_4(t1-t2)$ | $E_1R_4(t2-t3)$ | $E_1R_4(t3-t4)$ |
| 18 | $E_1R_5$ | $E_1R_5(t0-t1)$ | $E_1R_5(t1-t2)$ | $E_1R_5(t2-t3)$ | $E_1R_5(t3-t4)$ |
| 18 | $E_1R_6$ | $E_1R_6(t0-t1)$ | $E_1R_6(t1-t2)$ | $E_1R_6(t2-t3)$ | $E_1R_6(t3-t4)$ |
| | ... | ... | ... | ... | ... |

| | | 17 | | | |
|---|---|---|---|---|---|
| 18 | $E_1R_1$ | $E_1R_1(t0-t1)$ | | | |
| 18 | $E_1R_2$ | $E_1R_2(t0-t1)$ | $E_1R_1(t1-t2)$ | | |
| 18 | $E_1R_3$ | $E_1R_3(t0-t1)$ | $E_1R_2(t1-t2)$ | $E_1R_1(t2-t3)$ | |
| 18 | $E_1R_4$ | $E_1R_4(t0-t1)$ | $E_1R_3(t1-t2)$ | $E_1R_2(t2-t3)$ | $E_1R_1(t3-t4)$ |
| 19 | $E_1R_5$ | $E_1R_5(t0-t1)$ | $E_1R_4(t1-t2)$ | $E_1R_3(t2-t3)$ | $E_1R_2(t3-t4)$ |
| 18 | $E_1R_6$ | $E_1R_6(t0-t1)$ | $E_1R_5(t1-t2)$ | $E_1R_4(t2-t3)$ | $E_1R_3(t3-t4)$ |
| | ... | ... | ... | ... | ... |

20  21  22  23

METHOD FOR DYNAMIC TESTING USING ULTRASONIC IMAGING

TECHNICAL FIELD

The invention relates to the field of non-destructive testing such as non-destructive compliance testing of metal products. More specifically, the invention relates to ultrasonic testing for the presence of defects within a tubular metal product.

PRIOR ART

Metal pipes are widely used in various fields of the energy industry such as electricity generation, oil and gas, and mechanical engineering. Like most metallurgical products, pipes are susceptible to manufacturing defects, such as material being included in the steel, cracks on their inner or outer surface, or even porosity. In general, any heterogeneity in the steel matrix is considered to be an imperfection that is likely to adversely affect the mechanical strength of the pipe during service.

The pipes are therefore tested after they are manufactured, not only to detect any defects therein, but also, where appropriate, to determine information that is useful for assessing the danger of these defects, in particular their size, their depth, their position, their nature or even their orientation, and whether these pipes comply with standards.

In particular, non-destructive testing techniques using ultrasonic waves are used. Ultrasonic waves are propagated through the pipe and the waves reflected by the pipe are examined for defects that cannot be attributed to the geometry of the pipe. Defects such as any inclusion or absence of material constitute variations within the propagation medium of the wave, and thus cause some of the energy of the ultrasonic waves to be reflected when they are struck by these ultrasonic waves.

One type of sensor used for testing using ultrasonic waves is of the multi-element, sequentially controlled type, generally called a "multi-element transducer" or a "phased array transducer". This type of sensor comprises a plurality of electroacoustic elements, generally in the form of piezoelectric elements. These piezoelectric elements can be distributed over an active face of the sensor surrounding the pipe to be tested or in a main alignment direction so as to form an "array".

In the acquisition strategy referred to as FMC (Full Matrix Capture), with a multi-element sensor comprising a number n of elements, each of the elements n of the sensor is excited once, with these n elements being excited in succession in order to generate a number n of successive ultrasonic transmissions. A processing circuit records the individual response, hereafter called A-Scan, of the n elements of the sensor for each of the n emissions. For each element, this individual response represents the amplitude of the ultrasonic waves received by said element over a given listening duration. It is then possible to obtain an image representing a section of the pipe by combining the $n^2$ recorded A-Scans by means of a TFM (Total Focusing Method) algorithm.

In order to obtain TFM images over the entire surface of the pipe, acquisition from a plurality of successive shots requires a sequential relative movement of the sensor relative to the pipe. The sensor is held in a fixed position relative to the pipe for a full series of n shots in order to obtain a static mode TFM image of the pipe in this position, the sensor is then moved relative to the pipe in order to perform the next series of n shots with a view to obtaining the next image of the pipe.

This method allows precise images of the pipe to be obtained, but requires a long acquisition time. Therefore, a requirement exists for a method for quickly and reliably obtaining a precise image of a part to be tested.

SUMMARY

One idea behind the invention is to quickly and reliably obtain data representing a part, for example, TFM images or A-Scans of a pipe. In particular, one idea behind the invention is to obtain data representing the part to be tested during a relative movement between the sensor for obtaining this data and the part to be tested. More specifically, one idea behind the invention is to obtain this data during a continuous relative movement between the sensor and the part to be tested. One idea behind the invention is to take into account the relative movement between the sensor and the part to be tested for generating reliable and precise data representing the element to be tested.

According to one embodiment, the invention provides a method for dynamically acquiring data representing a part to be tested, said method comprising:

a step of acquiring data concerning the part to be tested, with said data being obtained by a multi-element sensor, said sensor comprising transmitting elements and receiving elements, the transmitting elements being configured to transmit a respective ultrasonic shot toward the part to be tested so that said ultrasonic shot propagates through the part to be tested, with the receiving elements being configured to receive waves reflected by the part to be tested, i.e., partially reflected and/or penetrating said part, then at least partially reflected and exiting, resulting from the ultrasonic shot, said acquisition step comprising:

transmitting an ultrasonic transmission shot from one of said transmitting elements; and said receiving elements receiving, during a listening duration, ultrasonic waves, with said received ultrasonic waves comprising one of said waves reflected by the part to be tested resulting from the transmitted ultrasonic shot;

the method further comprising a step of generating data representing the part to be tested as a function of the waves received by the receiving elements;

characterized in that it further comprises, during the data acquisition step, a relative movement between the sensor and the part to be tested;

and in that it further comprises a step of generating corrected data representing the part to be tested, with said step of generating corrected data comprising:

computing a corrective movement as a function of the relative movement between the sensor and the part to be tested, of a reference position and of a duration relative to a reference instant, with the reference position corresponding to a relative position between the sensor and the part to be tested at the reference instant, with said reference instant having occurred during the data acquisition step, said corrective movement corresponding to a relative movement between the sensor and the part to be tested up to the reference position from a relative position corresponding to the relative position between the sensor and the part to be tested at an instant of said duration relative to the reference instant; and applying a correction to the data representing the part to be tested as a function of the computed corrective movement so as to generate said corrected data by simulating a relative movement between the sensor and the part to be tested from a relative position between the sensor and the part to be tested at the instant of said duration up to the reference position.

Data representing a part to be tested is understood to mean information relating to the shape, the thickness, the differences in the media, etc., of the part to be tested. For example, this data representing the part to be tested can assume the form of a cross-sectional image of the part to be tested, a matrix comprising a plurality of A-Scans of the part to be tested, A-Scans of said part to be tested or any other form. Furthermore, the duration relative to the reference instant corresponds to the time difference between the acquisition time of a datum representing the part to be tested and the reference instant, with this duration being positive or negative depending on whether said acquisition time is before or after the reference instant.

By virtue of these features, it is possible to quickly and reliably obtain data representing a part to be tested. Indeed, by virtue of these features, it is possible to quickly obtain this data since the sensor and the part to be tested are moving relative to each other. Furthermore, due to the application of a correction as a function of the relative movement between the sensor and the part to be tested, the reference position and the duration relative to the reference instant, it is possible to obtain data with a high degree of precision that represents the part to be tested in the reference position, despite the relative movement between the sensor and the part to be tested when acquiring said data.

According to the embodiments, such a dynamic acquisition method can comprise one or more of the following features.

According to one embodiment, the relative movement between the sensor and the part to be tested is continuous. Such a continuous movement when acquiring data provides the method with a good execution speed.

The part to be tested can assume many forms. According to one embodiment, the part to be tested is a pipe. Such a pipe can assume many cross-sectional shapes, such as circular, square or other shapes. Similarly, such a pipe can have a constant or variable thickness.

According to one embodiment, applying a correction to data representing the part to be tested comprises a step of applying a virtual movement, for example, a virtual rotation about an axis of rotation of the part to be tested, to said data representing the part to be tested so as to generate corrected data. A virtual movement is understood to mean the modification of the data representing the profile of the part to be tested in order to simulate a corrective movement of the part to be tested without said part to be tested physically making such a corrective movement.

According to one embodiment, computing the corrective movement comprises computing a respective corrective movement for one, for several or for each datum representing the part. According to one embodiment, the duration relative to the reference instant for a respective corrective movement corresponds to the duration relative to the reference instant corresponding to the time difference between the instant corresponding to the relative position between the sensor and the part to be tested represented by said datum representing the part to be tested and the reference instant, with this duration being positive or negative depending on whether said instant represented by the datum representing the part to be tested to be corrected is before or after the reference instant. According to one embodiment, the application of the correction is carried out for one, for several or for each datum representing the part to be tested as a function of the respective corrective movement associated with said data representing the part to be tested.

According to one embodiment, the data acquisition step comprises:
transmitting a plurality of ultrasonic shots, preferably successively over time; and
for each step of transmitting one of said ultrasonic signals, a corresponding step, during a respective listening duration, of said receiving elements of the sensor receiving ultrasonic waves, with said received ultrasonic waves comprising at least one wave reflected by the part to be tested resulting from the corresponding transmitted ultrasonic shot;

and wherein the reference instant is a transmission instant of an ultrasonic shot of the plurality of ultrasonic shots and the duration is a multiple of the duration separating two successive ultrasonic shots of the plurality of ultrasonic shots so that the corrective movement is computed as a function of the relative movement between the sensor and the part to be tested between the transmission of two separate ultrasonic shots.

Two ultrasonic shots, and preferably all the ultrasonic shots, are fired sequentially, i.e., at separate transmission instants, so as to avoid interference between ultrasonic waves transmitted from separate transmitting elements.

The corrective movement can be computed for different portions of a relative movement between the sensor and the part to be tested. According to one embodiment, the corrective movement is computed as a function of the relative movement between the sensor and the part to be tested between the transmission of two separate ultrasonic shots, for example, two successive ultrasonic shots. In other words, according to one embodiment, the reference position is the relative position between the sensor and the part to be tested at a reference instant corresponding to the transmission of an ultrasonic shot.

By virtue of these features, and in particular by virtue of taking a plurality of shots from a plurality of transmitting elements of the sensor, it is possible to obtain information concerning the part to be tested in different orientations of said part to be tested. In particular, each ultrasonic shot allows a set of data to be obtained that relates to the part to be tested along an identified path of the ultrasonic wave, with said path starting from the position of the transmitting element and generating reflected waves received at the respective positions of the receiving elements receiving said reflected waves.

According to one embodiment, the step of generating corrected data comprises selecting a reference position. According to one embodiment, the reference position corresponds to a relative position between the part to be tested and the sensor during a selected ultrasonic shot. According to one embodiment, the reference position, and therefore the corresponding reference instant, is provided in advance by being selected, for example, by default, for example, by being stored in a storage memory of the system implementing the method. According to one embodiment, the reference position is the relative position between the sensor and the part to be tested at the instant of the first shot. According to one embodiment, the reference position is the relative position between the sensor and the part to be tested at the instant of the last transmitted ultrasonic shot.

Thus, it is possible to obtain a clear image of the part to be tested in a defined position, typically the reference position.

The data representing the part to be tested can assume many forms.

According to one embodiment, the data representing the part to be tested comprises an intensity of the ultrasonic waves reflected from the part to be tested and received by one or more or each receiving element of the sensor over time. Data representing the part to be tested in this form is referred to as A-Scans hereafter. According to one embodiment, the data representing the part to be tested comprises the A-Scans generated from the ultrasonic waves received by one, several or each of the receiving elements of the sensor resulting from the same ultrasonic signal transmitted by a transmitting element of the sensor.

According to one embodiment, the data representing the part to be tested comprises the A-Scans generated from the ultrasonic waves received by one, several or each of the receiving elements of the sensor resulting from a plurality of ultrasonic shots successively transmitted by a corresponding transmitting element of the sensor, and preferably from a plurality of respective ultrasonic shots successively transmitted by several separate transmitting elements of the sensor. According to one embodiment, the data representing the part to be tested comprises a matrix comprising the A-Scans generated from a plurality of successive ultrasonic shots and waves reflected by the part to be tested resulting from said ultrasonic shots and received by a plurality of receiving elements.

According to one embodiment, the data representing the part to be tested comprises a partial image for one, several or each of the ultrasonic shots of the plurality of ultrasonic shots transmitted during the acquisition step, with the application of a correction to the data representing the part to be tested comprising a step of modifying the partial image in order to simulate a movement of the part to be tested from the relative position between the transducer and the part to be tested illustrated in said partial image to the reference position in order to generate a corrected partial image.

According to one embodiment, a partial image is generated as a function of the waves reflected from the part to be tested resulting from the same ultrasonic shot. According to one embodiment, each point of a partial image is determined as a function of the A-Scans generated from the waves reflected by the part to be tested that are received by the receiving elements following the transmission of the same ultrasound signal.

According to one embodiment, the method comprises generating an image representing the part to be tested as a function of the corrected data. According to one embodiment, the method further comprises a step of generating an image representing the part to be tested by superimposing a plurality of corrected partial images.

Such partial images and corrected partial images allow an image to be obtained that represents the part to be tested and therefore allows information to be obtained concerning the part to be tested in a quick and clear manner, for example, concerning the location, the dimensions and other features of a defect present in the part to be tested.

According to one embodiment, the data representing the part to be tested comprises a matrix, with each row of the matrix comprising the data representing the part to be tested generated following a respective ultrasonic shot, with each column of the matrix comprising the data representing the part to be tested generated from a respective receiving element of the sensor, the computation of the corrective movement comprising, for each ultrasonic shot, computing a respective reception offset in terms of the number of receiving elements of the sensor, applying a correction comprising, for one, for several or for each row of the matrix, applying, for cells of said row, an offset, in terms of the number of columns, of the content of said cells of the corresponding reception offset.

According to one embodiment, the listening duration has a start instant equal to the transmission instant of the ultrasonic shot, with said listening duration being greater than or equal to a maximum time of flight between the transmission of the ultrasonic shot and the reception, by one of said receiving elements of the sensor, of a wave reflected by a face of the part to be tested opposite the sensor so that the corrective movement is computed as a function of the relative movement between the sensor and the part to be tested during a propagation time between a transmission instant of an ultrasonic shot and a reception instant of the waves reflected by the part to be tested resulting from said ultrasonic shot by the one or more receiving element(s). According to one embodiment, the final reception instant corresponds to the listening duration, i.e., the instant from which, following an ultrasonic shot, the one or more receiving element(s) is/are configured to no longer receive the ultrasonic waves, and in particular the ultrasonic waves resulting from said ultrasonic shot. In other words, according to one embodiment, the corrective movement is computed as a function of the relative movement between the sensor and the part to be tested when the same ultrasonic shot propagates from its transmission to the reception of the waves reflected by the part to be tested resulting from this ultrasonic shot by the one or more receiving element(s).

According to one embodiment, the data representing the part to be tested comprises, for each receiving element, a respective A-Scan representing an intensity of the waves received by said receiver as a function of the listening time of said receiving element.

According to one embodiment, computing the corrective movement comprises dividing the respective A-Scans of the receiving elements into a plurality of time blocks.

According to one embodiment, computing the corrective movement comprises computing a signal reception duration by one of said receiving elements of the plurality of receiving elements as a function of the relative movement between the sensor and the part to be tested. According to one embodiment, each time block of one of said A-Scans has a duration equal to the reception duration of the receiving element for the relative movement of the sensor relative to the part to be tested.

According to one embodiment, the signal reception duration of one of said receiving elements corresponds to the duration during which, during the relative movement between the sensor and the part to be tested, a signal continuously transmitted from the part to be tested is received by said receiving element, with a duration greater than this reception duration resulting in said continuous signal being received by an adjacent receiving element.

According to one embodiment, one, several or each time block has a duration equal to a signal reception duration of the receiver that received the waves reflected from the part to be tested that allowed said A-Scan to be generated.

According to one embodiment, computing the corrective movement comprises computing an offset in terms of the number of receiving elements as a function of the relative positions of the receiving elements, the signal reception durations of said receiving elements and the transmission instant of the ultrasonic signal.

According to one embodiment, the offset is an integer representing, for a given time block of an original A-Scan, the number of A-Scans by which said time block must be offset in the direction of relative movement between the part to be tested and the sensor. In other words, the offset represents the number of A-Scans between the original A-Scan and a target A-Scan to which said duration block must be assigned for the same time range.

According to one embodiment, for a given time block of an original A-Scan, the offset is equal to the maximum number of the next successive receiving elements in a direction of relative movement between the sensor and the part to be tested and originating from the receiving element that received the reflected waves of said original A-Scan, i.e., as a function of a reference position and of the direction of rotation of the part, for which the cumulative sum of the signal reception durations is less than the elapsed time between the reference instant and the start instant of said time block.

According to one embodiment, applying a correction comprises, for at least one time block of the original A-Scan, replacing a portion of a target A-Scan with said time block, with said target A-Scan corresponding to the A-Scan generated from the nth receiving element after the receiver that received some of the energy of the reflected waves of the original A-Scan, in the direction of relative movement between the sensor and the part to be tested, with n being the computed offset, the portion of the target A-Scan having the same start and end instant as the time block.

According to one embodiment, the relative movement between the sensor and the part to be tested results from a movement of the part to be tested and from the sensor being held in a fixed position during the movement of the part to be tested, with the movement of the part to be tested having an angular component about an axis of rotation, the computation of a corrective movement comprising a step of computing the angular movement of the part to be tested during said relative movement between the sensor and the part to be tested.

According to one embodiment, computing a corrective movement comprises a step of computing the angular movement of the part to be tested during said relative movement between the sensor and the part to be tested, and wherein correcting the data representing the part to be tested comprises simulating a rotation of the part to be tested about its axis of rotation at an angle corresponding to the angular movement of the part to be tested during the acquisition step.

Thus, by directly correcting the A-Scans, it is possible to obtain a clear and precise image of the part to be tested by taking into account the relative movement between the part to be tested and the sensor, including when the same ultrasonic shot propagates inside the part to be tested.

According to one embodiment, the relative movement between the sensor and the part to be tested can involve different types of movement.

According to one embodiment, the relative movement between the sensor and the part to be tested results from a movement of the part to be tested and from the sensor being held in a fixed position during the movement of the part to be tested. According to one embodiment, the movement of the part to be tested has an angular component about an axis of rotation, for example, the longitudinal axis of a pipe within the context of a part to be tested in the form of a pipe. According to one embodiment, the movement of the part to be tested has a longitudinal component along a longitudinal axis, for example, the longitudinal axis of the tested pipe. The part to be tested is, for example, set into a helical movement relative to the sensor. According to one embodiment, the relative movement between the sensor and the part to be tested results from the movement of the sensor and from the part to be tested being held in a fixed position.

According to one embodiment, computing a corrective movement comprises a step of computing the angular movement of the part to be tested. According to one embodiment, computing the corrective movement comprises computing the relative movement between the sensor and the part to be tested along an axis of relative movement between the sensor and the part to be tested.

According to one embodiment, the image representing the part to be tested is generated as a function of the corrected A-Scans.

BRIEF DESCRIPTION OF THE FIGURES

The invention will be better understood, and further aims, details, features and advantages thereof will become more clearly apparent throughout the following description of several particular embodiments of the invention, which are provided solely by way of a non-limiting illustration, with reference to the accompanying drawings, in which:

FIG. 10 is a representation of various A-Scans obtained by the sensor of FIG. 9 during the ultrasonic shot;

FIG. 11 is a representation of the various corrected A-Scans obtained from the original A-Scans illustrated in FIG. 10;

DESCRIPTION OF THE EMBODIMENTS

Oil, gas or other operations require a large number of pipes. Due to the many stresses that these pipes undergo both when they are installed and when they are operated, these pipes must comply with standards in order to prevent any degradation and leakage into the environment.

The tubular elements manufactured for this type of operation therefore must be tested to ensure that they do not have any defects that could undermine their operation. In order to carry out this test, data representing the pipe is generated using sensors, with this data allowing the presence and the features of any defects in the pipe to be detected. Such defects are, for example, surface cracks or even discontinuities in the material inside the pipe wall.

Figures 1, 2:
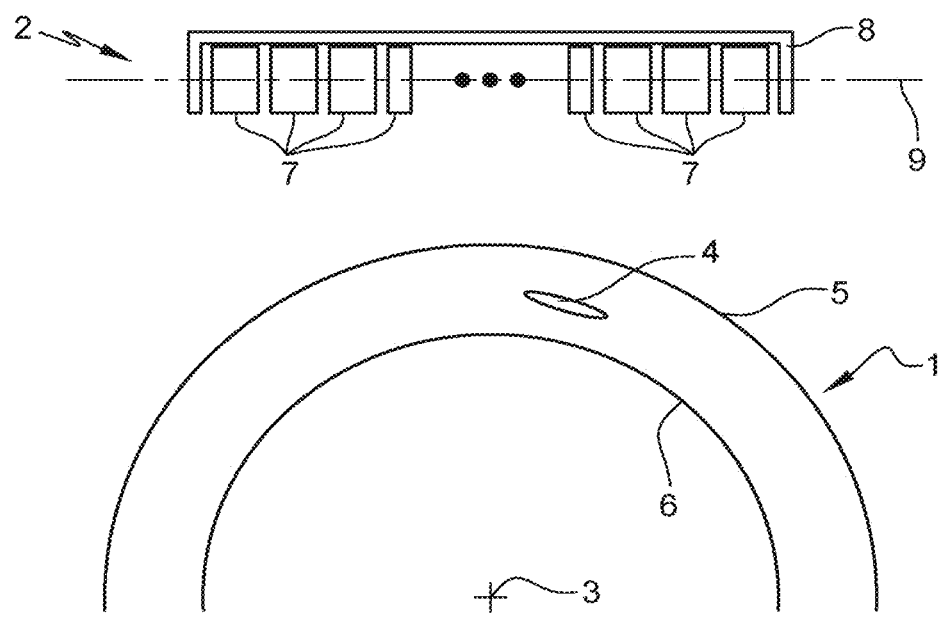
FIG. 1 is a cross-sectional view of a pipe with a defect and of a multi-element sensor configured to generate data representing the pipe.
FIG. 2 is a matrix of data representing the pipe generated from the sensor of FIG. 1.

FIG. 1 schematically illustrates a cross-sectional view of a pipe 1 and a sensor 2.

The pipe 1 has a circular cylindrical shape and has a longitudinal axis 3. The pipe 1 has a defect 4. The defect 4 is, for example, a crack in the wall of the pipe 1, i.e., this defect 4 is located between an outer surface 5 of the pipe 1 and an inner surface 6 of said pipe 1.

In order to provide data representing the pipe 1, the sensor 2 comprises a plurality of elements 7. In the embodiment illustrated in FIG. 1, the sensor 2 comprises a housing 8 supporting all the elements 7. These elements 7 are aligned along a longitudinal axis 9 of the sensor 2.

Each element 7 is able, on the one hand, to transmit an ultrasonic wave E, also called ultrasonic shot E, and, on the other hand, to receive received waves R. By way of an example, an element 7 can be a piezoelectric strip with a width of 1 mm and a length, also called elevation, of 10 mm.

The sensor 2 is positioned on the periphery of the pipe 1, for example, above, so that the elements 7 are oriented to transmit the ultrasonic wave E toward the pipe 1. For example, the sensor 2 is positioned so that its longitudinal axis 9 is perpendicular to the longitudinal axis 3 of the pipe 1. A coupling separates the pipe 1 from the surface of the sensor 2 to allow propagation of the ultrasonic waves E, for example, a column of water, gel or any other medium allowing propagation of the ultrasonic wave.

When an ultrasonic wave encounters a change of medium when it propagates, some of the energy of the ultrasonic wave is transmitted to the new medium and some of the energy of the ultrasonic wave is reflected back at the interface between the two media. Thus, some of the energy of the ultrasonic wave E transmitted by an element 7 of the sensor 2 is returned for each change of propagation medium that is encountered so that some of the energy of the ultrasonic wave E is reflected when this ultrasonic wave E respectively reaches the outer surface 5 of the pipe 1, the defect 4 or even the inner surface 6 of the pipe 1.

Following each transmission of an ultrasonic wave E, the signal representing the received ultrasonic waves and/or the absence of ultrasonic waves received by each of the elements 7 is recorded. These recordings are made during a predetermined time period following the transmission of an ultrasonic wave E. During this time period, the ultrasonic waves received by the element 7 comprise the waves resulting from the reflection of the ultrasonic wave on the pipe 1.

The elements 7 thus allow A-Scans representing the pipe 1 to be generated from all the received waves R, and therefore from the waves reflected following an ultrasonic shot E. Each A-Scan represents the amplitude of the received waves R received by an element 7 as a function of time, with this amplitude being zero when the element 7 does not receive an ultrasonic wave. These A-Scans therefore allow the state of the pipe 1 to be known as a function of the position of the element transmitting the ultrasonic wave E, the element receiving the reflected waves, the time of flight of the ultrasonic waves and the propagation media.

When testing the pipe 1, ultrasonic shots E are successively fired using each of the elements 7 of the sensor 2. For each ultrasonic shot E, a plurality of A-Scans type data is thus obtained, comprising the ultrasonic waves reflected by the pipe 1 and received by each of the elements 7 of the sensor 2.

For a sensor 2 comprising n elements 7, all the A-Scans generated from the successive ultrasonic shots E and the received ultrasonic waves R received by the n elements 7 are recorded in a matrix as illustrated in FIG. 2, where the A-Scan corresponding to the transmission by the element n and the reception by the element m is recorded in the cell $E_n R_m$. Such a matrix can be obtained in various ways, i.e., in accordance with various strategies for acquiring the A-Scans. According to one embodiment, the acquisition strategy of the matrix is of the TFM (Total Focusing Method) type. According to one embodiment, the acquisition method is of the "sparse-TFM" type (which means that not all the cells of the matrix contain an A-Scan (transmission and/or reception with some of the elements)), PWI (Plane Wave Imaging), i.e., several or all the elements are used for transmission for each ultrasonic shot, with different angles of incidence using a delay law for deflecting the ultrasonic beam, sparse-PWI, or any other acquisition method involving recording A-Scans associated with a multitude of ultrasonic trajectories covered between one or more transmitting element(s) and one or more receiving element (s).

In such a matrix, each row 10 represents all the A-Scans generated from the n elements 7 of the sensor 2 following the transmission of an ultrasonic wave $E_i$ transmitted by an $i^{nth}$ element 7. These A-Scans therefore represent the received waves $R_1$ to $R_n$ received by the n elements 7 following the transmission of the ultrasonic wave $E_i$. Thus, the first row 10 of the matrix illustrated in FIG. 2 comprises a set of data $E_1 R_1$, $E_1 R_2$ ... $E_1 R_{n-1}$, $E_1 R_n$, corresponding to the A-Scans generated from the received waves $R_1$, $R_2$ ... $R_{n-1}$ and $R_n$ received by the n elements 7 following the transmission of the ultrasonic shot $E_1$ by the first element 7. Similarly, the last row 10 of this matrix comprises a set of data $E_n R_1$, $E_n R_2$ ... $E_n R_{n-1}$ and $E_n R_n$ corresponding to the A-Scans generated from the received waves $R_1$ to $R_2$ received by the n elements 7 following the transmission of the ultrasonic shot $E_n$ by the $n^{nth}$ element 7.

Furthermore, each column 11 of this matrix comprises all the A-Scans generated from the received waves $R_j$ received by an $i^{nth}$ element 7 following the n successive ultrasonic shots $E_1$ to $E_n$ by the n elements 7. Thus, the first column 11 of the matrix illustrated in FIG. 2 comprises a set of data $E_1 R_1$, $E_2 R_1$ ... $E_n R_1$ corresponding to the A-Scans generated from the received waves $R_1$ received by the first element 7 following the n ultrasonic shots $E_1$ to $E_2$ by the n elements 7.

The matrix (also called "FMC matrix") illustrated in FIG. 2 therefore comprises n rows and n columns, with each row 10 corresponding to all the A-Scans generated following the transmission of an ultrasonic shot $E_i$ by an $i^{nth}$ element 7 of the sensor 2 and each column 11 corresponding to the A-Scans generated from the received waves $R_j$ received by a $j^{nth}$ element 7 of the sensor 2.

With the matrix illustrated in FIG. 2 comprising a set of data representing the pipe 1, it is possible to reconstitute an image from this matrix that corresponds to a cross-sectional representation of the pipe 1. In such an image, each pixel of the image is associated with a value representing the propagation medium of the pipe 1. For example, such an image comprises, for each point of the image, the sum of the values of the various A-Scans of the matrix as a function of the theoretical times of flight at said point of the image. In other words, all the A-Scans of the matrix are analyzed and compiled to define the acoustic properties of the pipe 1 at said image point. A theoretical time of flight of the ultrasonic wave is associated with each A-Scan and with each image point, which time of flight corresponds to the time required for the ultrasonic wave E leaving the transmitting element to reach the targeted image point, plus the time required for a wave reflected from said targeted image point to reach the receiving element corresponding to the A-Scan.

The amplitude of the A-Scan signal at the theoretical time of flight thus determined represents the constituent material of the pipe 1 for the targeted point. If the pipe 1 exhibits no defect or change in the nature of the medium at the targeted image point, the transmitted ultrasonic wave E is not reflected at said targeted point, so that there is no reflected wave and the A-Scan signal from the receiving element 7 has an amplitude of zero, or equivalent to the background noise, for example, related to the electronic system or other disturbances, at the determined theoretical time of flight. Conversely, if the targeted image point corresponds to a defect or change of medium in the pipe 1, then the transmitted ultrasonic wave E is reflected at said targeted image point so that the signal of the A-Scan of the receiving element 7 has a non-zero amplitude at the theoretical time of flight, with this non-zero amplitude representing the wave reflected at the targeted image point. The image obtained by adding the amplitude of the various A-Scans for each pixel as a function of the corresponding theoretical times of flight therefore can be used to determine the nature of the medium in which the ultrasonic wave E was travelling at each point in the image.

When the successive ultrasonic shots E are transmitted without relative movement between the sensor 2 and the pipe 1, analyzing all the A-Scans of the matrix as a function of the time of flight allows a clear and good quality image of the pipe 1 to be obtained. However, this relative immobility between the sensor 2 and the pipe 1 when acquiring data representing the pipe 1 requires a significant data acquisition time. Indeed, the relative positioning between the sensor 2 and the pipe 1 needs to be maintained when acquiring all the A-Scans of a matrix, i.e., from the first ultrasonic shot $E_1$ until the reception of the received waves $R_n$ following the last ultrasonic shot $E_n$ by the last receiving element 7. This solution is therefore hardly compatible with an industrial process that requires the fastest possible analysis of large lengths of pipe 1.

In order to improve the speed for acquiring data representing the pipe 1, the pipe 1 and the sensor 2 are set into relative movement when acquiring the data. This relative movement between the pipe 1 and the sensor 2, and therefore the elements 7, is preferably continuous.

Within the context of the following description, the data representing the pipe 1 is acquired by holding the sensor 2, and therefore the elements 7, in a fixed position and by causing the pipe 1 to helically move about its longitudinal axis 3. Such a relative movement between the pipe 1 and the elements 7 is equivalent, on the one hand, to a translation movement of the elements 7 along the longitudinal axis 3 of the pipe 1 and, on the other hand, to a rotation about said longitudinal axis 3 of the pipe 1. Such a helical movement of the pipe 1 is carried out, for example, at a speed of rotation about the longitudinal axis 3 of the pipe 1 of the order of 1 m/s. However, this relative movement between the pipe 1 and the sensor 2 also could be obtained by holding the pipe 1 in a fixed position and by rotating the sensor 2 about the pipe 1 or by any other relative movement between the sensor 2 and the pipe 1.

The relative movement between the pipe 1 and the elements 7 involves a relative movement of the defect 4 relative to the elements 7. This relative movement results in an angular offset of the location of the defect 4 about the longitudinal axis 3 of the pipe 1 relative to the elements 7. Between two successive ultrasonic shots E, the data recorded by the elements 7 within the same matrix therefore shows an angular offset corresponding to the relative movement between the pipe 1 and the elements 7.

Figure 3:
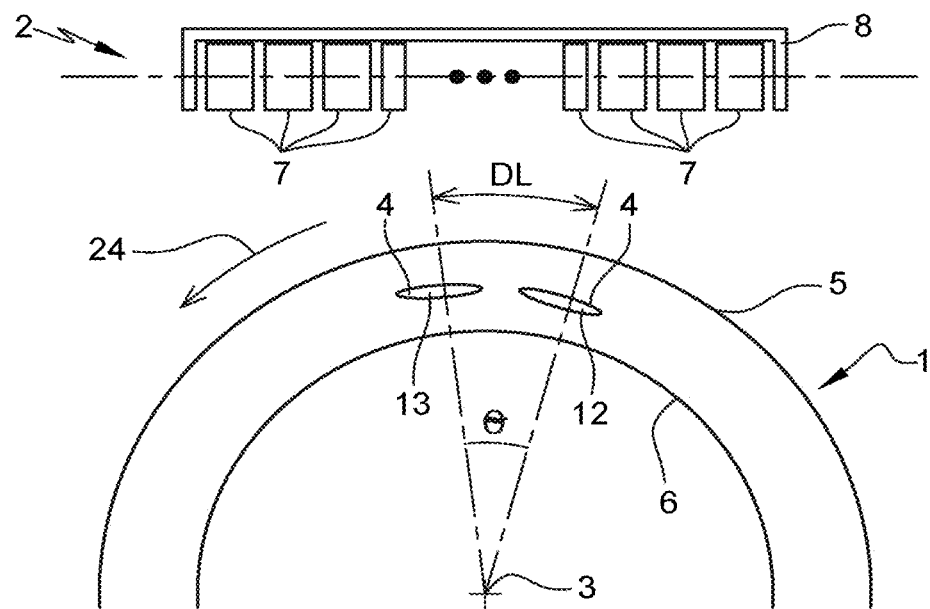
FIG. 3 is a cross-sectional view of the pipe of FIG. 1 when said pipe is rotated by an angle α between two successive ultrasonic shots.

FIG. 3 illustrates such a movement of the defect 4 by an angle θ between two successive ultrasonic shots $E_i$ and $E_{i+1}$. This movement of the defect 4 is related to the rotation of the pipe 1 in a direction of rotation 24 about the longitudinal axis 3. For the sake of readability and understanding, the same defect 4 is illustrated both in a first position 12 and in a second position 13 in FIG. 3, thus illustrating the offset of the angle θ in the positioning of the defect 4 between two successive ultrasonic shots $E_i$ and $E_{i+1}$.

With respect to this FIG. 3, it is clear that a clear image of the pipe 1 cannot be obtained with the method described above. Indeed, due to this movement of the defect 4 between the two successive ultrasonic shots $E_i$ and $E_{i+1}$, the A-Scans generated from these two successive ultrasonic shots $E_i$ and $E_{i+1}$ do not have amplitudes representing the defect 4 at the same location in the pipe 1. For a targeted point of an image of the pipe 1, the A-Scans resulting from the ultrasonic shot $E_i$ have an amplitude corresponding to the presence of the defect 4 in a first position 12, while the A-Scans resulting from the ultrasonic shot $E_{i+1}$ have an amplitude corresponding to the presence of the defect 4 in a second position 13, with this second position 13 being offset by the angle θ relative to the first position 12. Consequently, the sum of the amplitudes of the various A-Scans for a targeted point of the image no longer represents the structure of the pipe 1 since, for the same targeted point of the image, the amplitudes of the various A-Scans of the matrix do not correspond to the same position of the defect 4. Therefore, the image thus obtained from the matrix is blurred, with the defect 4 being inaccurately shown on the image, with the defect 4 appearing as a trail forming an arc of a circle instead of a well defined spot.

The blurring effect of the image is even greater the higher the speed of rotation of the pipe 1 about its longitudinal axis 3. Indeed, the faster the pipe 1 rotates about its longitudinal axis 3, the greater the angular offset θ of the defect 4 between two ultrasonic shots $E_i$ and $E_{i+1}$ and therefore the greater the angular positioning offset of the defect 4 between these two successive ultrasonic shots $E_i$ and $E_{i+1}$.

Figure 4:
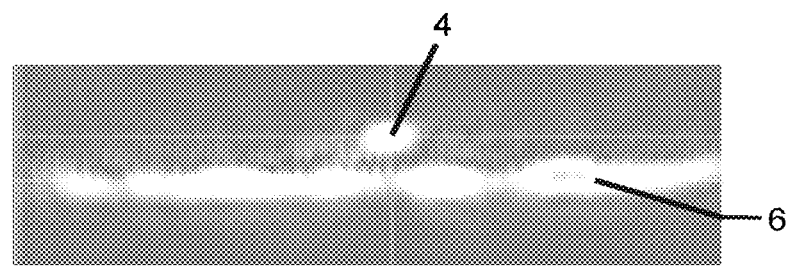
FIG. 4 is an image representing the pipe that is obtained from the matrix of FIG. 2 when the pipe moves at a speed of rotation of 0.109 m/s.
Figure 5:
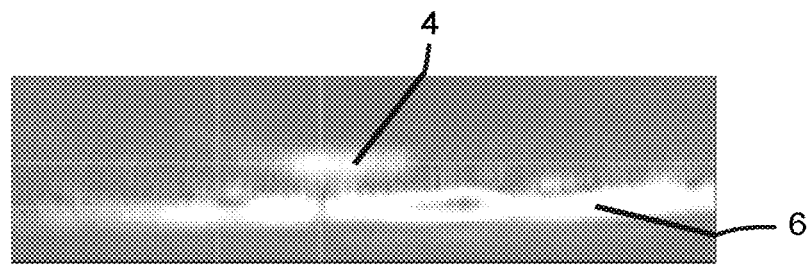
FIG. 5 is a similar image to FIG. 4 when the pipe moves at a speed of rotation of 0.36 m/s.
Figure 6:
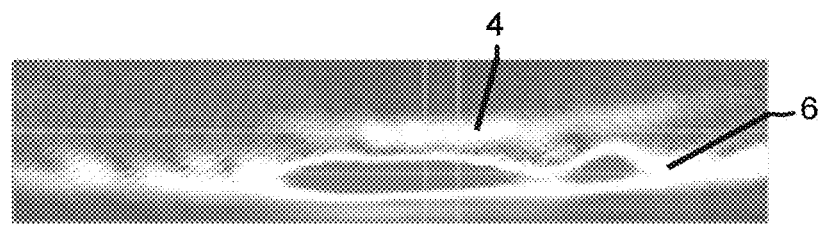
FIG. 6 is a similar image to FIG. 4 when the pipe moves at a speed of rotation of 0.8 m/s.

FIGS. 4 to 6 illustrate, by way of an example, three images generated within the context of a pipe 1 and of a sensor 2 similar to those shown above with reference to FIGS. 1 to 3, with the pipe 1 being helically moved at different speeds. These precise images are generated using a 10 MHz sensor 2 comprising 64 elements 7 spaced apart by 0.35 mm center-to-center.

FIG. 4 shows a precise image obtained as a result of the ultrasonic shots E of all the elements 7 with a pipe 1 speed of rotation of 0.109 m/s.

FIG. 5 shows a precise image obtained as a result of the ultrasonic shots E of all the elements 7 with a pipe 1 speed of rotation of 0.36 m/s.

FIG. 6 shows a precise image obtained as a result of the ultrasonic shots E of all the elements 7 with a pipe 1 speed of rotation of 0.8 m/s.

With the pipe 1 rotating at a reduced speed of rotation of 0.109 m/s (FIG. 4), the rotation of the pipe 2 has no noticeable impact on the obtained image, which shows the defect 4 properly located and reliably sized. However, this speed is too low and does not correspond to industrial rates.

With a pipe 1 speed of rotation of 0.36 m/s, the obtained image allows the presence of the defect 4 to be detected without any further information concerning this defect 4. Indeed, the defect 4 is shown in this image of FIG. 5 in such a blurred way that only the information concerning the presence of a defect 4 can be obtained on this image, without further details concerning the features of this defect 4. With a pipe 1 speed of rotation of 0.8 m/s, as illustrated in FIG. 6, the obtained image is even more blurred and even the detection of the defect 4 can be questionable because its amplitude is even more reduced as it occupies a large surface area on the image.

In order to obtain an unblurred image despite the relative movement between the pipe 1 and the sensor 2, the reconstruction of the image according to the invention advantageously takes into account the relative movement between the pipe 1 and the sensor 2 when acquiring data. To this end, the data representing the pipe 1 obtained during the relative movement between the pipe 1 and the sensor 2 is corrected.

One idea behind this correction is to acquire the data representing the pipe 1 during a relative movement between the pipe 1 and the sensor 2 and then to modify this data by simulating a movement of the pipe 1 around a reference position. This reference position is a relative position between the sensor 2 and the pipe 1 during the movement of the pipe 1. This reference position can be predetermined or even arbitrarily selected. This reference position can be any relative position between the sensor 2 and the pipe 1 during the movement of the pipe 1, for example, the relative position between the pipe 1 and the sensor 2 at a reference instant corresponding to the transmission instant of the first ultrasonic shot $E_1$ or the last ultrasonic shot $E_n$.

Modifying the data by simulating a relative movement between the pipe 1 and the sensor 2 up to the selected reference position allows corrected data to be generated that substantially corresponds to the data that would have been obtained in the absence of relative movement between the pipe 1 and the sensor 2 at said reference position. In other words, the idea is to generate data representing the pipe 1 during a relative movement between the pipe 1 and the sensor 2, and then to modify this data in order to simulate an acquisition of said data within the context of a static relative position between the pipe 1 and the sensor 2.

Throughout the remainder of the description, this reference position and the associated reference instant correspond to the relative position between the pipe 1 and the sensor 2 at the transmission instant of the first ultrasonic shot $E_1$. Thus, taking into account the movement of the pipe 1 amounts to simulating, for each shot, an inversion of said movement of the pipe 1 from the position corresponding to the data to be corrected to the position of the first ultrasonic shot $E_1$.

In order to simulate an inversion of the relative movement between the pipe 1 and the sensor 2 between two successive ultrasonic shots $E_i$ and $E_{i+1}$, each ultrasonic shot E is processed individually in order to generate a respective partial image. This partial image corresponds to a cross-sectional view of the pipe 1 in the respective relative position of the pipe 1 relative to the sensor 2 generated by the data originating from a single ultrasonic shot E. A plurality of partial images is therefore generated, with each partial image being generated from the data obtained following a respective ultrasonic shot E. These partial images are generated in a similar manner to the method described above but only taking into account the A-Scans obtained for a given ultrasonic shot E (i.e., a single row of the FMC matrix) and not from the A-Scans of the whole matrix.

Such a partial image comprises, for each pixel of the partial image, the sum of the amplitudes of the A-Scans generated from a single ultrasonic shot E. Each pixel of the partial image is therefore associated with the sum of the amplitudes of the A-Scans from a single ultrasonic shot E.

However, due to the fact that each partial image is only formed from a single ultrasonic shot E, each partial image represents the pipe 1 in a specific relative position of the pipe 1 relative to the sensor 2. In order to combine the various obtained partial images in order to obtain a clear and precise image of the pipe 1, the angular offset needs to be taken into account between the various successive ultrasonic shots E. To this end, the partial images generated from the rows of A-Scans of the matrix are modified by simulating the inversion of the movement between the pipe 1 and the sensor 2 from a relative reference position in order to obtain corrected partial images.

In order to simulate an inversion of the relative movement between the pipe 1 and the sensor 2, the relative movement completed between the pipe 1 and the sensor 2 needs to be known between two successive ultrasonic shots $E_i$ and $E_{i+1}$.

Within the context of helically driving the pipe 1 resulting in the rotation of said pipe 1 about its longitudinal axis 3 at a speed of $V_{rot}$, with a sensor 2 with a PRF (Pulse Repetition Frequency) number of ultrasonic shots per second, the outer surface 5 of the pipe 1 moves between two successive ultrasonic shots $E_i$ and $E_{i+1}$ by a distance $\Delta L$ in accordance with the equation $\Delta L = V_{rot}/PRF$.

However, between a first ultrasonic shot $E_i$ taken by a transmitting element i at a time $t_i$ and a second ultrasonic shot $E_{i+1}$ taken by a transmitting element i+1 at a time $t_{i+1}$, the defect 4 has moved by an angle $\Delta\theta$. This angle $\Delta\theta$ corresponds to the rotation of the pipe 1 about its longitudinal axis 3 during a time slot $\Delta t = t_{i+1} - t_i$ between two successive ultrasonic shots $E_i$ and $E_{i+1}$. The distance $\Delta L$ covered by the outer surface 5 between two successive ultrasonic shots $E_i$ and $E_{i+1}$ is therefore also in accordance with the equation $\Delta L = R*\Delta\theta$, where R is the radius of the pipe 1 on the outer surface 5 and $\Delta\theta$ is the angle expressed in radians corresponding to the rotation of the pipe 1 about its longitudinal axis 3 between two successive ultrasonic shots $E_i$ and $E_{i+1}$.

It follows from these two equations that $\Delta\theta = V_{rot}/(R*PRF)$.

With respect to the matrix illustrated in FIG. 2, this means that between two rows 10 of said matrix, and therefore between two successive ultrasonic shots $E_i$ and $E_{i+1}$, the recorded data is offset by an angle $\Delta\theta$ in accordance with the equation $\Delta\theta = V_{rot}/(R*PRF)$. In other words, the partial images generated from two successive rows 10 of the matrix illustrated in FIG. 2 are geometrically offset by a rotation by an angle $\Delta\theta$ about a point that is the center of rotation of the pipe 1, in theory its axis 3.

As explained above, the partial image obtained from the first ultrasonic shot $E_1$ is arbitrarily selected as the relative reference position. The angular position of the pipe 1 relative to this reference angular position is then computed for all the other ultrasonic shots $E_i$. In the example provided above, the second partial image obtained from the ultrasonic shot $E_2$ has an angular offset of the pipe 1 by an angle $\Delta\theta$ about its axis of rotation relative to the reference partial image, with the $i^{th}$ partial image obtained from the $i^{th}$ ultrasonic shot having an angular offset by an angle $(i-1)*\Delta\theta$ about its axis of rotation relative to the reference partial image.

The partial images are then corrected by applying a rotation to the position of the pipe 1 shown in said partial images that is inverse to the computed angular offset. Within the context of a pipe 1 rotating by an angle $\Delta\theta$ between two successive ultrasonic shots $E_i$ and $E_{i+1}$, this amounts to generating the partial images and then, for each $i^{th}$ partial image thus generated, simulating a rotation of the pipe 1 on said partial image about its longitudinal axis 3 by an angle $\alpha=(i-1)*\Delta\theta$ in a direction of rotation inverse to the direction of rotation of the pipe 1.

With respect to the matrix illustrated in FIG. 2, taking the first partial image as a reference image, the corrected partial image generated from the first row 10 of the matrix is identical to the partial image generated from said first row 10 since, in this case, i=1 and the correction to be made relative to the reference partial image corresponds to a rotation by an angle $\alpha=(1-1)*\Delta\theta=0$ about the longitudinal axis 3 of the pipe 1. The corrected partial image generated from the second row 10 of the matrix corresponds to the application of a rotation of the pipe 1 by an angle $\alpha=(2-1)*\Delta\theta=\Delta\theta$ about the longitudinal axis 3 of the pipe 1 in a direction of rotation opposite the direction of rotation of the pipe 1 in the partial image generated from said second row 10 of the matrix. In general, the corrected partial image generated from an $n^{th}$ row 10 of the matrix corresponds to applying a rotation by an angle $\alpha=(n-1)*\Delta\theta$ about the longitudinal axis 3 of the pipe 1 in a direction of rotation opposite the direction of rotation of the pipe 1 in the partial image generated from said $n^{th}$ row 10 of the matrix.

With such a correction, the corrected partial images are equivalent to images that would have been obtained by means of a sensor 2 that is fixed relative to the pipe 1 from a single respective ultrasonic shot E. The corrected partial images thus obtained therefore show an identical position of the defect 4 despite the movement of said defect 4 when acquiring data, with this position of the defect 4 corresponding to the reference position. A clear image of the pipe 1 then can be generated by superimposing the corrected partial images that are obtained after rotation, i.e., by adding the representative amplitudes of the pipe 1 for each pixel of the corrected partial images that are combined.

The image obtained by superimposing the corrected partial images after rotation does not generate a blurring effect and allows a clear and precise image of the pipe 1 to be obtained, on which image it is possible to precisely characterize the shape and the size of the detected defects 4.

The above example is provided within the context of a pipe 1 as shown in FIG. 3, which is rotated relative to elements 7 aligned along the longitudinal axis 9 perpendicular to the longitudinal axis 3 of the pipe 1. However, the correction could be similarly applied with any other shape of a part to be tested, as well as for any other type of relative movement. The idea is to generate data representing a part to be tested during a relative movement between said part and the sensor, and then to modify this data by simulating a relative movement so that the corrected data is equivalent to data that would have been obtained in the absence of a relative movement between the part to be tested and the sensor.

By way of an example, within the context of a relative movement in the form of a translation movement along the longitudinal axis 3 of the pipe 1, i.e., without rotation of the pipe 1, the correction would involve simulating a relative movement along said longitudinal axis 3 of the pipe 1 up to the reference position, i.e., generating partial images corrected by translation movement along the axis 3 of the pipe 1 and in a direction of translation bringing the partial images obtained from the matrix to the reference position.

Alternatively, an inversion of the movement of the pipe 1 can be simulated without generating partial images. In an alternative embodiment, the correction is made by directly offsetting the A-Scans in the matrix. This embodiment allows a corrected matrix to be obtained, from which a clear image of the pipe section can be directly obtained using the method for adding the amplitude of the A-Scans described above.

Figure 7:
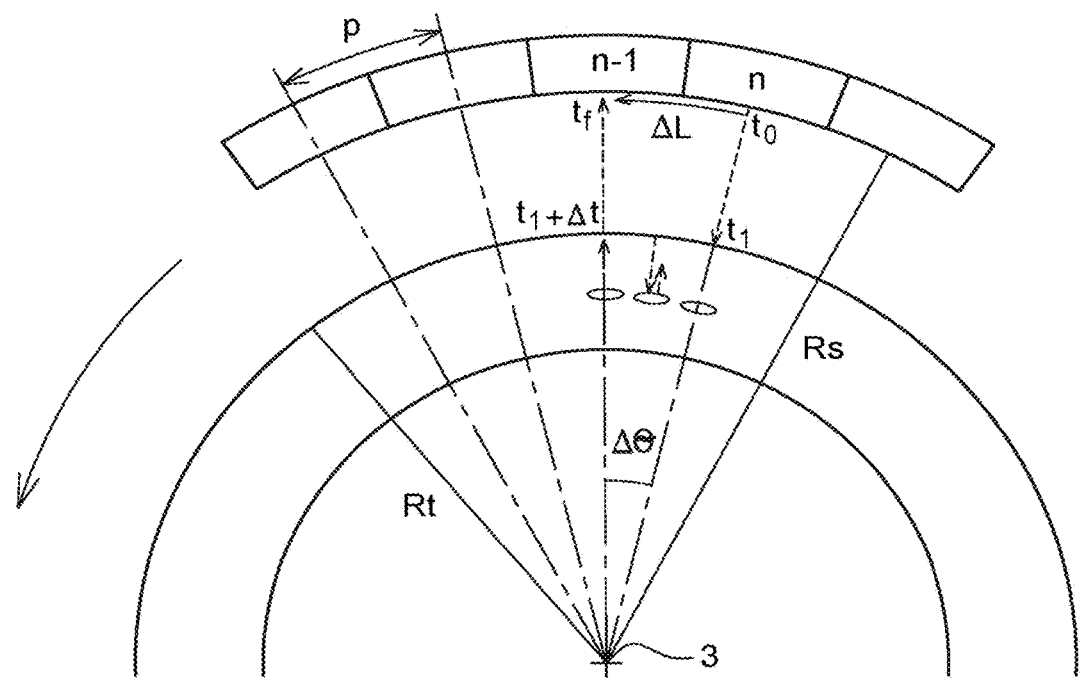
FIG. 7 is a cross-sectional view of the pipe of FIG. 1 illustrating various positions of the pipe defect as a function of the rotation of the pipe within the context of a circular multi-element sensor surrounding the pipe.

FIG. 7 illustrates the case of a sensor 2 surrounding n elements. In this example, the pipe 1 alone is rotated about its longitudinal axis 3. In particular, this FIG. 7 illustrates the reception offset, in terms of the number of receiving elements 7, of the received waves R due to the rotation of the pipe 1. In this FIG. 7, an ultrasonic shot E is transmitted at the time $t_0$, this ultrasonic wave E enters the pipe at the time $t_i$, a reflected wave R exits the pipe 1 at the time $t_i+\Delta t$ and is received by the receiving element 7 at the time $t_f$.

When the pipe 1 rotates by an angle $\Delta\theta$ during a time slot $\Delta t$, the rotation of the pipe 1 generates an offset between the transmitting and receiving points of the ultrasonic shot E by a distance $\Delta L$ on the surface of the sensor 2. In order to make it easier to understand this phenomenon, the example illustrated in FIG. 7 presents the case of a $\Delta L$ equal to the pitch of the sensor 2, i.e., the distance between the center of two adjacent elements 7, but the invention similarly applies to any other value of $\Delta L$.

In the case illustrated in FIG. 7, the following equations are obtained:

$$\Delta L = Rs \times \Delta\theta \quad (1)$$

$$\Delta\theta = V_\theta \times \Delta t \quad (2)$$

$$V_{rot} = V_\theta \times Rt \quad (3),$$

where Rs is the inner radius of the sensor 2, $V_\theta$ is the angular speed of rotation of the pipe 1 in rad/s, $V_{rot}$ is the speed of rotation of the pipe 1 in m/s and Rt is the outer radius of the pipe 1.

A distance in terms of the number of elements $D_{el}$ between the transmitting and receiving points of the ultrasonic shot E on the sensor 2, during one and the same ultrasonic shot E, expressed as the number of elements 7 of the sensor 2, corresponds to the ratio between $\Delta L$ and the pitch p of the sensor 2, i.e., in accordance with the following equation:

$$D_{el} = \Delta L / p \quad (4).$$

With respect to equations 1 to 3 above, it follows that:

$$D_{el} = (Rs \times V_{rot} \times \Delta t)/(p \times Rt) \quad (5).$$

Thus, by selecting the initial position of the pipe 1 as the reference position at the beginning of the acquisition, typically when transmitting the first ultrasonic shot $E_1$, the movement of the pipe 1 after listening to the received waves R following the first ultrasonic shot $E_1$ is equal to the rotation carried out during a time slot $\Delta t$ illustrated in FIG. 7, for example. Similarly, relative to this initial position of the pipe 1, the movement of the pipe 1 after listening to the received waves following the second ultrasonic shot $E_2$ is equal to the rotation completed during a time slot $\Delta t+1/PRF$. In general, relative to this initial position of the pipe 1 at the beginning of the acquisition, the movement of the pipe 1 upon reception of the received waves R resulting from the $k^{th}$ shot is equal to the rotation completed during a time slot $\Delta t+(k-1)/PRF$.

The distance $D_{el}$ (k) between the transmitting and receiving points on the sensor 2, for the $k^{th}$ shot and expressed as the number of elements of the sensor 2, is therefore in accordance with the equation:

$$D_{el}(k)=(\Delta L+\Delta L2)/p \qquad (6),$$

with:

$$\Delta L2=Rs\times\Delta\theta PRF \qquad (7), \text{ and}$$

$$\Delta\theta PRF=V_\theta/PRF \qquad (8),$$

where $\Delta\theta PRF$ is the angle of rotation of the pipe 1, during a time slot 1/PRF.

Therefore, the following is obtained:

$$D_{el}(k)=[(Rs\times V_{rot})/(p\times Rt)]\times[\Delta t+(k-1)/PRF)] \qquad (9).$$

Once $D_{el}$ (k) has been computed for each of the n ultrasonic shots E of the acquisition, the following approximations can be made:
If $D_{el}(k<0.5$, the offset in terms of the number of elements is zero;
If $0.5<D_{el}(k)<1.5$, the offset in terms of the number of elements is 1 element;
If $x+0.5<D_{el}(k)<x+1.5$, the offset in terms of the number of elements is x+1 elements.

The $D_{el}$ computation allows the matrix to be directly corrected by directly offsetting the recorded A-Scans in the matrix. Typically, as explained above with respect to FIG. 2, when the matrix is generated, the cell $E_iR_j$ of the matrix contains the A-Scan of the waves received following the ultrasonic shot transmitted by the element i and for which the reflected waves are received by the element j. However, the reflected waves resulting from the ultrasonic shot $E_i$ that should be received by the element j in the absence of a relative movement between the pipe 1 and the sensor 2 are, due to the rotation of the pipe 1 when acquiring data, received by the element $j+D_{el}(i)$. Thus, the A-Scan $E_iR_j$ is actually in cell $E_iR_{(j\pm Del(i))}$ of the matrix, as a function of the direction of rotation of the pipe 1 relative to the numbering direction of the elements 7 of the sensor 2. This offset $D_{el}$ therefore needs to be taken into account in order to obtain a corrected matrix. A complete unblurred image then can be obtained using the method described above by adding the amplitudes of the A-Scans of the corrected matrix that is obtained.

Figure 8:
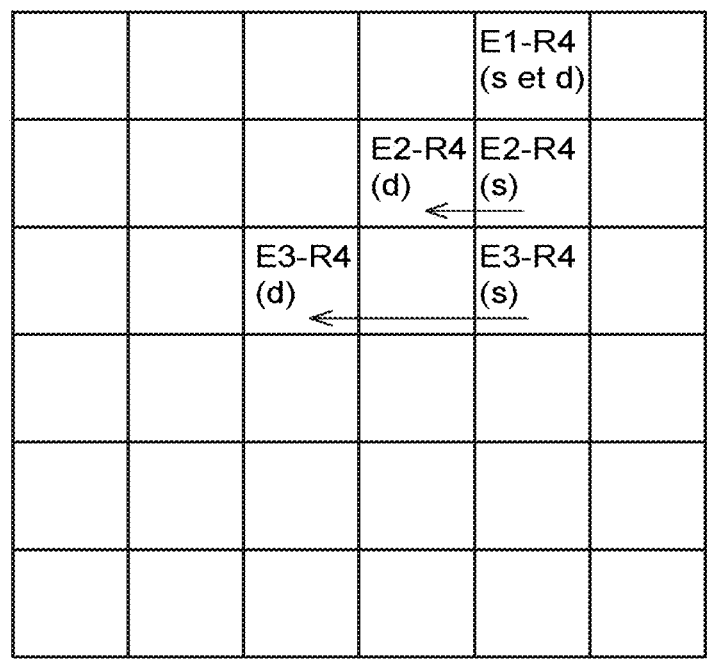
FIG. 8 is a simplified representation of a matrix similar to the matrix of FIG. 2 obtained using the sensor of FIG. 7 and illustrating the correction made as a function of a rotation of the pipe.

FIG. 8 illustrates an example of a matrix showing the initial positions of the generated A-Scans, denoted $E_iR_j(s)$, and the corrected positions of said A-Scans in the matrix, denoted $E_iR_j(d)$. In this example, the offset in terms of the number of computed elements $D_{el}$ increases by one element for each new ultrasonic shot E compared to the initial ultrasonic shot $E_1$.

In this FIG. 8, the first or initial ultrasonic shot $E_1$ does not require an offset of the A-Scans $E_iR_j(s)$ in the first row 10. The A-Scans $E_iR_j(s)$ of the second row 10 are offset by one column as a function of the direction of rotation of the pipe 1, by one column to the left in the illustrated example. Similarly, the A-Scans $E_iR_j(s)$ of the third row 10 are offset two columns to the left of FIG. 8, etc. A corrected matrix is thus obtained in which the A-Scans $E_iR_j(d)$ associated with the various cells correspond to the A-Scans that would be generated in the absence of a relative movement between the tube 1 and the sensor 2. A clear image then can be generated by adding the amplitudes of the A-Scans $E_iR_j(d)$ to the appropriate times of flight of this corrected matrix as explained above.

When the offset $D_{el}$ results in an offset of the content of the cells outside the matrix, the matrix is advantageously increased by a corresponding number of elements, with the computation of the clear image taking into account elements 7 virtually added to the sensor 2, with these elements 7 being added in the continuity of the elements 7 of the sensor 2, i.e., with an identical pitch. In an alternative embodiment, these A-Scans offset outside the matrix can be ignored, but the clear image is then computed from a reduced number of A-Scans.

In order to improve the clarity of the obtained images, it is also possible to take into account the rotation of the pipe 1 about its longitudinal axis 3 when each ultrasonic shot E propagates in the pipe 1. Indeed, if the speed of rotation of the pipe 1 is particularly high, it is possible for the defect 4 to significantly move between the moment an ultrasonic shot E is transmitted and the moment the reflected ultrasonic waves resulting from this ultrasonic shot E are received.

The following description is provided within the context of a high speed of rotation causing the defect 4 to move when an ultrasonic shot E propagates, but this movement also could be related to factors other than the speed of rotation. Such factors can be, for example, the height of the water column and/or the thickness of the pipe 1, which also affect the time of flight of the ultrasonic wave and consequently the PRF (Pulse Repetition Frequency).

From a certain speed of rotation of the pipe 1, the rotation of the pipe 1 during the propagation of an ultrasonic shot E is such that the energy transmitted by the same ultrasonic shot E is received by the elements 7 with a spatial reception offset. Thus, between the transmission instant of the ultrasonic shot E by an element 7 of the sensor 2 and the reception instant of a returned reflected wave R resulting from this ultrasonic shot E, the pipe 1 may have rotated such that the reflected wave is not received by the element 7 that should have been the targeted receiving element 7 if the pipe 1 had remained fixed, but is received by another element 7.

Figure 9:
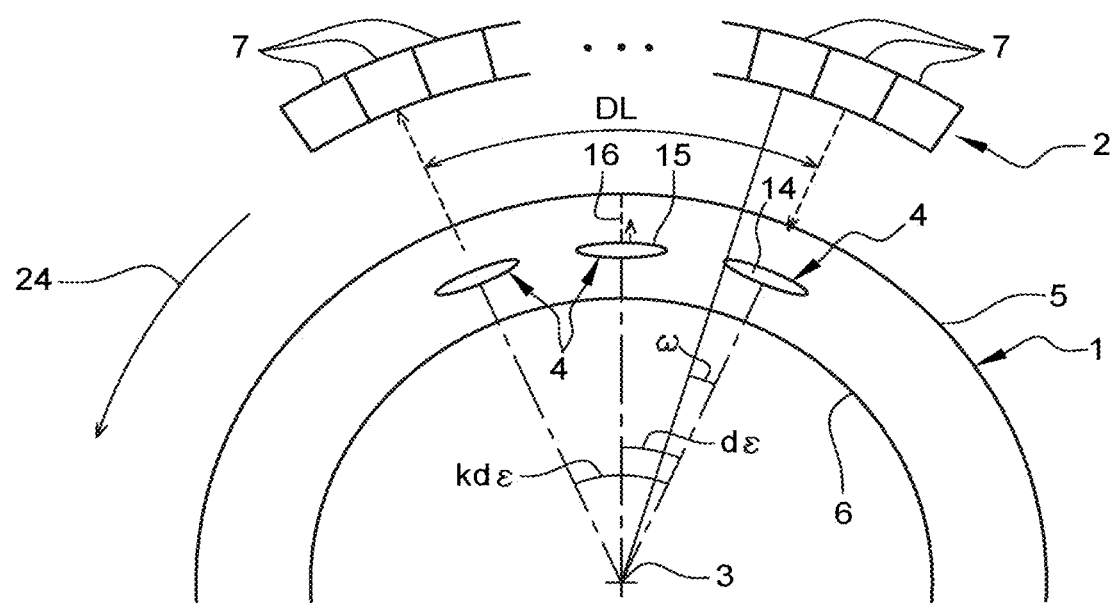
FIG. 9 is a cross-sectional view of the pipe of FIG. 1 illustrating various positions of the pipe defect as a function of the rotation of the pipe during the same ultrasonic shot.

FIG. 9 illustrates this phenomenon of the offset in reception of the reflected waves during the propagation of the same ultrasonic shot E in the pipe 1. In this FIG. 9, the sensor 2 is circular and the elements 7 are arranged in a circular manner around the pipe 1.

In this FIG. 9, an ultrasonic shot $E_n$ is transmitted by the element n. This ultrasonic shot $E_n$ impacts the outer surface 5 of the pipe 1 at the time ti, with the defect 4 then being in a first position 14 relative to the sensor 2. The ultrasonic shot $E_n$ then propagates in the pipe 1.

At the time ti+dt, with dt representing a rotation time of the pipe 1, the pipe 1 has rotated by an angle dξ. At the time ti+dt, the ultrasonic shot $E_n$ has reached the defect 4, with the defect 4 then having a second position 15, and a reflected wave 16 resulting from the reflection of the ultrasonic shot $E_n$ from this defect 4 travels toward the outer surface 5 of the pipe 1.

At the time ti+k*dt, the reflected wave 16 resulting from the reflection of the shot $E_n$ on the defect 4 returns to the outer surface 5 of the pipe 1 and exits the pipe 1. At said time ti+k*dt, the pipe 1 has rotated about its longitudinal axis 3 by an angle k*dξ. During the time k*dt, the outer surface 5 of the pipe 1 has rotated by a distance DL in accordance with the equation $DL=V_{rot}*k*dt$.

If the propagation time k*dt of the ultrasonic shot $E_n$ in the pipe 1 and/or the speed of rotation $V_{rot}$ of the pipe 1 are such that DL is negligible relative to the angular distance separating the centers of two adjacent elements 7, and preferably relative to the distance between the centers of two adjacent elements 7 divided by two, then the movement of the pipe 1 relative to the sensor 2 can be considered to be negligible during the same ultrasonic shot E. The rotation of the pipe 1 is therefore considered to be insufficient to create a reception offset during the same ultrasonic shot E.

If the propagation time k*dt of the ultrasonic shot $E_n$ in the pipe 1 and/or the speed of rotation $V_{rot}$ of the pipe 1 are such that DL is greater than the distance separating the centers of two adjacent elements 7, some of the reflected waves received by the receiving elements 7 normally would have been received by other elements. Consequently, the reflected waves R received by a receiving element 25 following the ultrasonic shot E transmitted by a transmitting element 26 do not represent an identified propagation path for the association between said receiving element 25 and transmitting element 26. The A-Scan generated following the reception of the waves reflected by the receiving element 25 is therefore erroneous.

The data $E_i R_i$ recorded in the matrix, i.e., the A-Scans corresponding to the received waves $R_i$ received by the various elements 7 following each ultrasonic shot E, are themselves erroneous. It is then the A-Scans $E_i R_i$ themselves that must be corrected in the matrix in order to obtain a clear image of the pipe 1.

In a similar manner to the correction of the partial images or the matrix explained above, correcting the A-Scans involves simulating a relative movement between the pipe 1 and the sensor 2 up to the reference position in order to be able to generate corrected A-Scans corresponding to the A-Scans that would have been obtained in the absence of a relative movement between the pipe 1 and the sensor 2.

In order to explain this offset phenomenon in the A-Scans, the case of an ultrasonic shot $E_i$ transmitted by an $i^{th}$ element 7 and the received waves $R_i$ following said ultrasonic shot $E_i$ received by this same $i^{th}$ element 7 is used.

Provided that the propagation medium of the ultrasonic wave $E_i$ between the sensor 2 and the pipe 1 is not moving relative to the sensor 2, the reflected wave resulting from the impact of the shot $E_i$ on the outer surface 5 of the pipe 1, also called interface echo, is not affected by the rotation of the pipe 1. This interface echo is therefore normally received by the $i^{th}$ transducer 7.

As explained above, between the instant ti the shot $E_i$ impacts the outer surface 5 of the pipe 1 and the instant ti+k*dt at which the reflected wave 16 returns to the outer surface 5 of the pipe 1, said pipe 1 has rotated by an angle k*dξ.

If k*dξ is greater than the angle ω formed by the center of the pipe 1 and the centers of two adjacent elements 7, then a reflected wave resulting from the impact of the shot $E_i$ on the defect 4 and exiting in a direction perpendicular to the outer surface 5 of the pipe 1, which would therefore be received by the $i^{th}$ element 7 in the absence of rotation of the pipe 1, does not exit opposite the $i^{th}$ element 7. Consequently, this reflected wave is received by a $j^{th}$ element distinct from the $i^{th}$ element 7.

Thus, if k*dξ is greater than the angle ω, the A-Scans are distorted and they need to be corrected by taking into account the rotation k*dξ of the pipe 1 during the propagation of the ultrasonic shot $E_i$ in the pipe 1. As explained above and in a similar manner to taking into account the rotation of the pipe 1 between two successive ultrasonic shots $E_i$ and $E_{i+1}$, the idea is to simulate a movement of the pipe 1 to the reference position, typically an inversion of the movement of the pipe 1 when the reference position is the position at the instant the shot is transmitted, in order to obtain corrected A-Scans that are substantially equivalent to the A-Scans that would be obtained in the absence of movement of the pipe 1. To this end, for each ultrasonic shot E, the A-Scans resulting from the waves received R by the various elements 7 are generated in a first instance and then corrected in a second instance.

A first step of correcting the A-Scans involves computing a time increment dtp resulting in a rotation dlp equal to the distance separating the center of two adjacent elements 7. In the example shown in FIG. 9, this is equivalent to determining the angle ω separating the center of two adjacent elements 7 and to computing the time dtp required for the pipe 1 to complete a rotation equivalent to this angle ω.

In a second instance, the A-Scans are divided into blocks 17 of duration dtp. In FIGS. 10 and 11, each block 17 is associated with a reference $E_i R_j (t_x - t_y)$ meaning that it involves the waves received R over a duration $t_x - t_y$ by a $j^{th}$ element following an $i^{th}$ ultrasonic shot.

FIG. 10 illustrates A-Scans 18 resulting from the reception of the received waves R by a plurality of elements 7 following the same ultrasonic shot E. In this FIG. 10, each A-Scan 18 shown is generated from the received waves R received by an element 7 during a series of time slots dtp. In this FIG. 10, each of the A-Scans 18 is therefore divided into a plurality of time blocks 17, with each time block 17 having a duration dtp corresponding to the duration of rotation of the pipe 1 required to cover the angle ω separating the center of two adjacent elements 7.

As explained above, in an A-Scan 18 illustrated in FIG. 10, the various time blocks 17 do not all represent an identified path between the transmitting element 26 and the receiving element 25 that allowed said A-Scan to be generated at the corresponding time of flight. Indeed, due to the rotation of the pipe 1, these blocks 17 are generated from reflected waves received by the receiving element 25 but which should have been received by other elements 7, due to the rotation of the pipe 1.

The correction of an A-Scan therefore involves, for each A-Scan generated from the received waves R received by an element 7, selecting the blocks 17 that should have been received by another element 7 and associating said blocks 17 with the element 7 that normally should have received this block 17. Within the context of a rotation of the pipe 1, this amounts to offsetting the blocks 17 from an original A-Scan generated from the received waves R received by an element 7 to a respective target A-Scan that normally should have received the reflected waves corresponding to said block 17 in the absence of rotation of the pipe 1.

FIG. 11 illustrates the various A-Scans corrected for the various elements 7 from the original A-Scans illustrated in FIG. 10.

In FIG. 10, the $i^{th}$ blocks 17 are generated from the received waves R received during the time periods $d_{ti}$ to $d_{ti+1}$. However, at the instant $d_{ti}$, the pipe 1 has rotated about its longitudinal axis 3 by an angle i*ω. The reflected waves represented in these $i^{th}$ blocks 17 were therefore received by elements 7 offset by i blocks 17. In other words, the reflected wave received by a $k^{th}$ element 7 during the time period $d_{ti}$ to $d_{ti+1}$ would, in the absence of a relative movement between the sensor 2 and the pipe 1, have been received by a k-$i^{th}$ element 7.

The correction of the A-Scans 18 by simulating the reverse movement of the pipe 1, within the context of a reference position corresponding to the transmission instant of the ultrasonic shot, therefore can be carried out by offsetting the $i^{th}$ blocks 17 of the period $d_{ti}$ to $d_{ti+1}$ by a number i of A-Scans 18 in the reverse direction of rotation of the pipe 1. In other words, in order to correct the A-Scans 18, the blocks 17 $d_{tpi}$-$d_{tpi+1}$ of an A-Scan 18 generated by an $n^{th}$ element 7 are offset to the corresponding block 17, i.e., the block 17 of the period $d_{tpi}$-$d_{tpi+1}$, of the element i+n.

Thus, in FIG. 11, the blocks 17 of the A-Scans 18 illustrated in FIG. 10 are offset in order to simulate the inversion of the movement of the pipe 1. The $i^{th}$ blocks 17 of each row of FIG. 10 are therefore offset by i rows in FIG. 11 in order to correct the A-Scans 18 of FIG. 10. In FIG. 11, as obtained by this correction, each row therefore has a corrected A-Scan 18 corresponding to the A-Scan 18 that would have been obtained by the element 7 associated with said row in the absence of a relative movement between the pipe 1 and the sensor 2.

By comparing between FIG. 10 and FIG. 11, it therefore can be seen that the second blocks 17 of each row L of FIG. 10, corresponding to a time slot $d_{tp1}$-$d_{tp2}$, are offset by one row in FIG. 11 in order to replace the second block 17 of the next row, i.e., row L+1. Similarly, the third blocks 17 of each row L of FIG. 10, corresponding to a time slot $d_{tp2}$-$d_{tp3}$, are offset by two rows in FIG. 11 in order to replace the third block of row L+2. For example, a corrected A-Scan 19 of FIG. 11 corresponding to the fifth element 7, typically the fifth row of FIG. 11, successively comprises, from the time $t_0$ to the time $d_{tp4}$, a first block 20 of the fifth row of FIG. 10, a second block 21 of the fourth row of FIG. 10, a third block 22 of the third row of FIG. 10 and a fourth block 23 of the second row of FIG. 10. This corrected A-Scan 19 therefore comprises blocks 20 to 23 corresponding to the received waves R received by the various elements 7 within the context of a rotation of the pipe 1 relative to the sensor 2 and which would have been received only by the fifth element 7 if there had been no relative movement between the pipe 1 and the sensor 2.

In FIG. 11, the empty boxes correspond to blocks 17 with a zero amplitude signal for the A-Scans. These blocks 17 are not very damaging as they represent an empty amplitude signal that therefore does not alter the obtained image. In any case, when the offset causes the blocks 17 of the original A-Scan to be offset outside the target A-Scan, the duration of the target A-Scan is advantageously increased by a number of blocks 17 similarly corresponding to the virtual increase in the size of the matrix described above.

Furthermore, to make it easier to understand the correction made to the A-Scans 18, FIGS. 9 to 11 illustrate the case of a circular sensor 2 so that each element 7 covers a circular section with an identical angle ω around the pipe 1. Thus, the rotation of the pipe 1 causes an offset in the reception of the reflected waves R that is identical for all the elements 7 so that the duration $d_{tp}$ for dividing the blocks 17 is identical for all the A-Scans 18. However, the elements 7 can be arranged in many ways. For example, the elements 7 can be aligned along a longitudinal axis, as is the case in the embodiment illustrated in FIGS. 1 and 3. In this case, the curvature of the pipe 1 relative to the position of the various elements 7 needs to be taken into account. To this end, the one or more $d_{tp}$ can be computed by taking into account other parameters such as the exit angle of the reflected waves or even the projected DL on the alignment axis 9 of the elements 7. For each element 7, such a computation results in blocks 17 being obtained with different durations depending on the relative location of the element 7 relative to the pipe 1. Similarly, this difference in the duration of the blocks 17 between the various elements 7 needs to be taken into account in order to determine the offset of the blocks 17 between the various elements 7.

Furthermore, the relative movement between the pipe 1 and the sensor 2 that is corrected in the example provided above for illustrative purposes is an angular movement relative to the longitudinal axis 3 of the pipe 1. However, this movement could be of another type, such as a translation movement along said longitudinal axis 3, or other.

Figure 12:
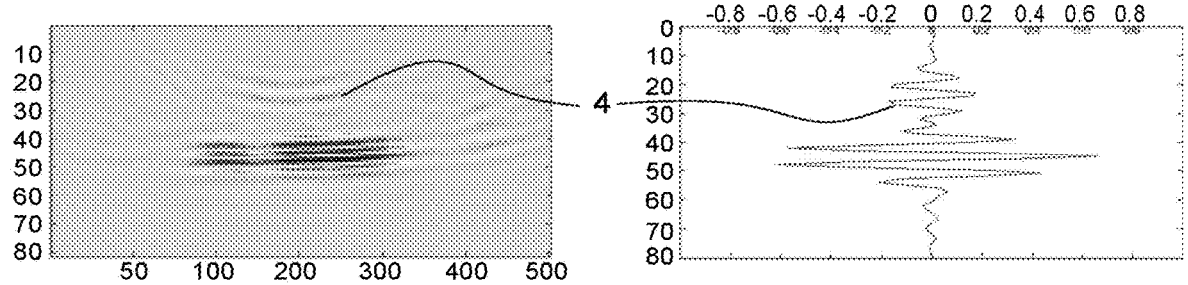
FIG. 12 shows a raw image and the amplitudes of the pixels in column 150 of this raw image without correction.

FIG. 12 illustrates a raw image (left-hand part of the figure) and the amplitudes of the pixels of column 150 of this raw image (right-hand part of the figure). This raw image is generated from raw data, i.e., before correction according to the invention, acquired during a relative movement between the pipe 1 and the sensor 2. This raw image shows the defect 4 in the pipe 1 but has significant blurring that does not allow the defect 4 to be characterized precisely.

Figure 13:
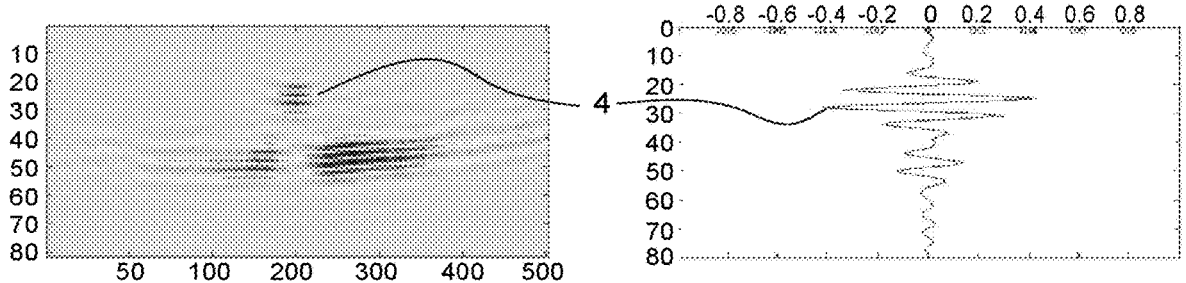
FIG. 13 illustrates a corrected image obtained by modifying the data used to generate the raw image of FIG. 12 in order to take into account the relative movement between the pipe and the sensor, as well as the amplitudes of the pixels of column 150 of this corrected image.

FIG. 13 illustrates the image corrected using the method described above using partial images and the amplitudes of the pixels in column 150 of this corrected image. This corrected image is clear and easily allows precise and reliable characterization of the defect 4 despite the fact that the data for generating this corrected image was obtained during a relative movement between the pipe 1 and the sensor 2. The gain in amplitude of the defect provided by the correction is 5.7 dB. Thus, by virtue of the invention, a clear and precise image of a part to be tested can be obtained in a quick and reliable manner, with the data enabling this corrected image to be obtained being acquired during the relative movement between the pipe 1 and the sensor 2.

The above description is provided within the context of a metal pipe 1, for example, but the element to be tested could assume any other nature in terms of shape and/or materials.

The above description is provided within the context of a sensor comprising elements 7 that are equally capable of transmitting and receiving ultrasonic waves. However, such a sensor could comprise separate ultrasonic transmitting and receiving elements.

Even though the invention has been described in relation to a plurality of specific embodiments, it is obvious that it is by no means limited thereto and that it comprises all the technical equivalents of the means described, as well as their combinations if they fall within the scope of the invention.

Thus, the examples described above are carried out within the context of a linear sensor 2; however, the method can be applied within the context of sensors comprising elements 7 arranged in two dimensions allowing a volume to be reconstructed in three dimensions in a manner equivalent to the reconstruction described above for a two-dimensional reconstruction of an image. Such a sensor comprises, for example, a plurality of elements 7 arranged in rows and columns.

The use of the verb "comprise" or "include" and of its conjugated forms does not exclude the presence of other elements or other steps than those stated in a claim.

In the claims, any reference sign between brackets cannot be interpreted as a limitation of the claim.

The invention claimed is:

1. A method for dynamically acquiring data representing a metal part to be tested, said method comprising:
   a step of acquiring data concerning the part to be tested, with said data being obtained by a multi-element sensor, said sensor comprising transmitting elements and receiving elements, the transmitting elements being configured to transmit a respective ultrasonic shot toward the part to be tested so that said ultrasonic shot propagates through the part to be tested, with the receiving elements being configured to receive waves reflected by the part to be tested resulting from the ultrasonic shot, said acquisition step comprising:

transmitting an ultrasonic transmission shot from one of said transmitting elements; and said receiving elements receiving, during a listening duration, ultrasonic waves, with said received ultrasonic waves comprising one of said waves reflected by the part to be tested resulting from the transmitted ultrasonic shot;

the method further comprising a step of generating data representing the part to be tested as a function of the waves received by the receiving elements;

wherein said method further comprises, during the data acquisition step, a step of moving one from among the part to be tested and the sensor so as to generate a relative movement between the sensor and the part to be tested; and wherein said method further comprises a step of generating corrected data representing the part to be tested, with said step of generating corrected data comprising:

computing a corrective movement as a function of the relative movement between the sensor and the part to be tested, of a reference position and of a duration relative to a reference instant, with the reference position corresponding to a relative position between the sensor and the part to be tested at the reference instant, with said reference instant having occurred during the data acquisition step, said corrective movement corresponding to a relative movement between the sensor and the part to be tested up to the reference position from a relative position corresponding to the relative position between the sensor and the part to be tested at an instant of said duration relative to the reference instant; and applying a correction to the data representing the part to be tested as a function of the computed corrective movement so as to generate said corrected data by simulating a relative movement between the sensor and the part to be tested from a relative position between the sensor and the part to be tested at the instant of said duration up to the reference position.

2. The dynamic acquisition method as claimed in claim 1, wherein the step of generating corrected data comprises selecting the reference position.

3. The dynamic acquisition method as claimed in claim 1, wherein the data acquisition step comprises:

transmitting a plurality of ultrasonic shots; and for each step of transmitting one of said ultrasonic signals, a corresponding step, during a respective listening duration, of said receiving elements of the sensor receiving ultrasonic waves, with said received ultrasonic waves comprising at least one wave reflected by the part to be tested resulting from the corresponding transmitted ultrasonic shot;

and wherein the reference instant is a transmission instant of an ultrasonic shot of the plurality of ultrasonic shots and the duration is a multiple of the duration separating two successive ultrasonic shots of the plurality of ultrasonic shots so that the corrective movement is computed as a function of the relative movement between the sensor and the part to be tested between the transmission of two separate ultrasonic shots.

4. The dynamic acquisition method as claimed in claim 3, wherein the data representing the part to be tested comprises a partial image for the plurality of ultrasonic shots transmitted during the acquisition step, the application of a correction to the data representing the part to be tested comprising a step of modifying the partial image in order to simulate a movement of the part to be tested from the relative position between the sensor and the part to be tested illustrated in said partial image up to the reference position in order to generate a corrected partial image.

5. The dynamic acquisition method as claimed in claim 4, further comprising a step of generating an image representing the part to be tested by superimposing a plurality of corrected partial images.

6. The dynamic acquisition method as claimed in claim 3, wherein the data representing the part to be tested comprises a matrix, with each row of the matrix comprising the data representing the part to be tested generated following a respective ultrasonic shot, with each column of the matrix comprising the data representing the part to be tested generated from a respective receiving element of the sensor, the computation of the corrective movement comprising, for each ultrasonic shot, a computation of a respective reception offset in terms of the number of receiving elements of the sensor, the application of a correction comprising, for each row of the matrix, the application, for cells of said row, of an offset, in terms of the number of columns, of the content of said cells of the corresponding reception offset.

7. The dynamic acquisition method as claimed in claim 1 wherein the listening duration has a start instant equal to the transmission instant of the ultrasonic shot, with said listening duration being greater than or equal to a maximum time of flight between the transmission of the ultrasonic shot and the reception, by one of said receiving elements of the sensor, of a wave reflected by a face of the part to be tested opposite the sensor so that the corrective movement is computed as a function of the relative movement between the sensor and the part to be tested during a propagation time between a transmission instant of the ultrasonic shot and a reception instant by the receiving elements of the waves reflected by the part to be tested resulting from said ultrasonic shot.

8. The dynamic acquisition method as claimed in claim 7, wherein the data representing the part to be tested comprises, for each receiving element, a respective A-Scan representing an intensity of the waves received by said receiver as a function of the listening time of said receiving element.

9. The dynamic acquisition method as claimed in claim 8, wherein computing the corrective movement comprises dividing the respective A-Scans of the receiving elements into a plurality of time blocks.

10. The dynamic acquisition method as claimed in claim 9, wherein computing the corrective movement comprises computing a signal reception duration by one of said receiving elements of the plurality of receiving elements as a function of the relative movement between the sensor and the part to be tested, and wherein each time block of one of said A-Scans has a duration equal to the reception duration of the receiving element for the relative movement of the sensor relative to the part to be tested.

11. The dynamic acquisition method as claimed in claim 10, wherein computing the corrective movement comprises computing an offset in terms of the number of receiving elements as a function of the relative positions of the receiving elements, the signal reception durations of said receiving elements and the transmission instant of the ultrasonic signal.

12. The dynamic acquisition method as claimed in claim 11, wherein, for a given time block of an original A-Scan, the offset is equal to the maximum number of the next successive receiving elements in a direction of relative movement between the sensor and the part to be tested and originating from the receiving element that received the reflected waves of said original A-Scan, for which the cumulative sum of the signal reception durations is less than the elapsed time between the reference instant and the start instant of said time block.

13. The dynamic acquisition method as claimed in claim 12, wherein applying a correction comprises, for at least one time block of the original A-Scan, replacing a portion of a target A-Scan with said time block, with said target A-Scan corresponding to the A-Scan generated from the nth receiving element after the receiver that received the reflected waves of the original A-Scan, in the direction of relative movement between the sensor and the part to be tested, with n being the computed offset, the portion of the target A-Scan having the same start and end instant as the time block.

14. The dynamic acquisition method as claimed in claim 1, wherein the relative movement between the sensor and the part to be tested results from a movement of the part to be tested and from the sensor being held in a fixed position during the movement of the part to be tested, with the movement of the part to be tested having an angular component about an axis of rotation, the computation of a corrective movement comprising a step of computing the angular movement of the part to be tested during said relative movement between the sensor and the part to be tested.

15. The dynamic acquisition method as claimed in claim 14, wherein computing a corrective movement comprises a step of computing the angular movement of the part to be tested during said relative movement between the sensor and the part to be tested, and wherein correcting the data representing the part to be tested comprises simulating a rotation of the part to be tested about its axis of rotation at an angle of angular movement of the part to be tested during the acquisition step up to the reference position.

* * * * *